Jan. 5, 1926.  1,568,210
C. N. COLSTAD
WINDSHIELD WIPER
Filed Feb. 17, 1922   2 Sheets-Sheet 1
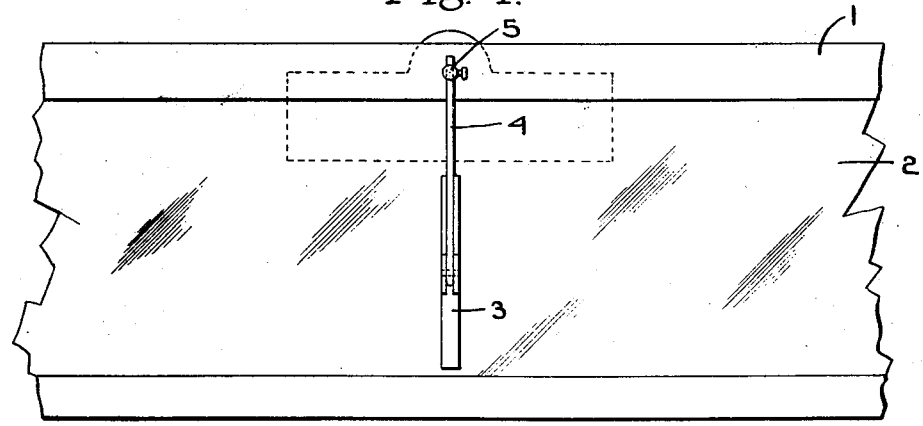
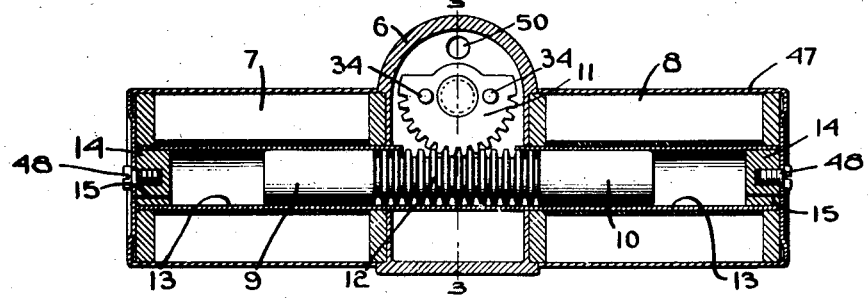
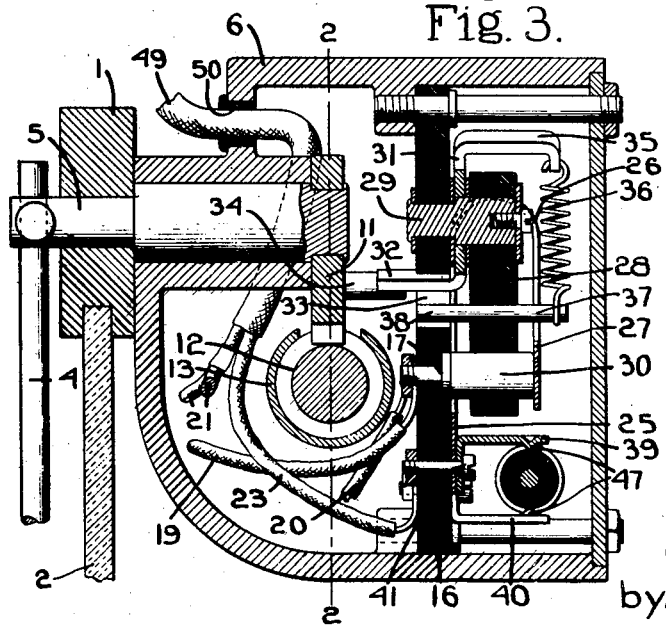
Inventor.
Charles N. Colstad
by Heard Smith & Tennant.
Attys.

Jan. 5, 1926.  1,568,210
C. N. COLSTAD
WINDSHIELD WIPER
Filed Feb. 17, 1922   2 Sheets-Sheet 2
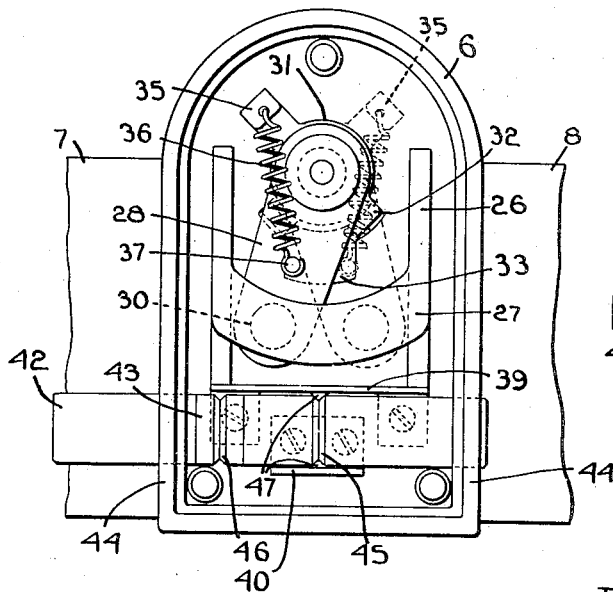
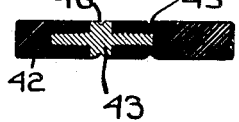
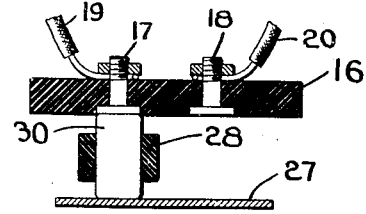
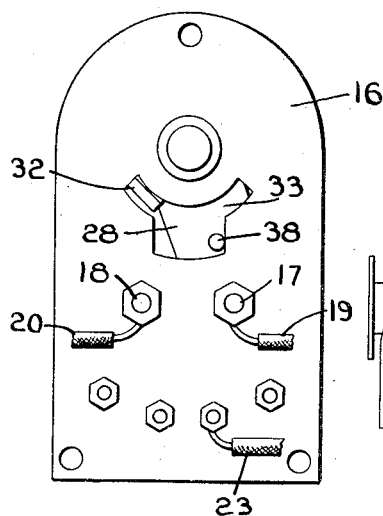
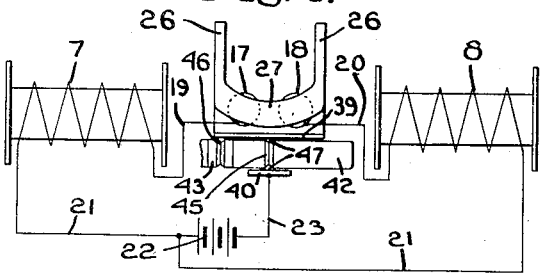
Inventor.
Charles N. Colstad
by Heard Smith & Tennant.
Attys Patented Jan. 5, 1926.

1,568,210

UNITED STATES PATENT OFFICE.

CHARLES N. COLSTAD, OF NORFOLK DOWNS, MASSACHUSETTS.

WINDSHIELD WIPER.

Application filed February 17, 1922. Serial No. 537,280.

*To all whom it may concern:*

Be it known that I, CHARLES N. COLSTAD, a citizen of the United States, and resident of Norfolk Downs, county of Norfolk, State of Massachusetts, have invented an Improvement in Windshield Wipers, of which the following description, in connection with the accompanying drawing, is a specification, like characters on the drawing representing like parts.

This invention relates to wind shield wipers of the so-called "automatic" type, that is a wind shield wiper in which means are provided for automatically moving or swinging the wiping element over the wind shield glass for keeping the latter clean.

One of the objects of my invention is to provide an automatic wind shield wiper in which the wiping element is given its operative movement by or through solenoids, and another object of the invention is to provide an improved solenoid-operated wind shield wiper which is provided with means for controlling the speed of movement of the wiper.

Other objects of the invention are to provide various improvements in wind shield wipers of this type all as will be more fully hereinafter set forth.

In order to give an understanding of the invention I have illustrated in the drawings a selected embodiment thereof which will now be described after which the novel features will be pointed out in the appended claims.

Fig. 1 is a fragmentary view of a wind shield showing the wind shield wiper attached thereto.

Fig. 2 is a sectional view on a reduced scale on the line 2—2, Fig. 3.

Fig. 3 is a section on an enlarged scale on the line 3—3, Fig. 2.

Fig. 4 is a front view of the housing with the cover plate removed.

Fig. 5 is a view of the manually-operated switch.

Fig. 6 is a wiring diagram.

Fig. 7 is a rear view of the plate supporting the operative parts.

Fig. 8 is a fragmentary sectional view through the switch arm 28 and illustrating the contact member 30 and contacts with which it engages.

In Fig. 1, 1 indicates a portion of the frame of a wind shield supporting the upper glass panel 2. 3 indicates the wiping element of the wind shield wiper which may be of the usual construction having a rubber or felt element that is in contact with the glass 2 and that performs the wiping operation as the member 3 is moved over the glass. This member 3 is shown as pivotally connected to an arm 4 which is secured to a shaft 5 that extends through the upper roll 1 of the wind shield frame and is journalled in a housing or support 6 that is secured to the wind shield. The shaft 5 is arranged to rock in the housing 6 and the rocking movement swings the wind shield wiper in the path indicated by dotted lines Fig. 1, all as usual in various types of automatic wind shield wipers.

One object of my invention is to provide a wind shield wiper of this type in which the shaft 5 is given its turning movement by or through the operation of one or more solenoids. In the preferred embodiment of my invention I propose to use two solenoids which are alternately energized, one solenoid operating to turn the shaft 5 and swing the arm 4 in one direction, and the other solenoid operating to turn the shaft 5 and swing in the arm 4 in the opposite direction. Means are also provided for automatically energizing the solenoids so as to provide the desired oscillating movement in the shaft 5.

In the construction herein shown the two solenoids which thus operate the device are indicated at 7 and 8 respectively and these solenoids are shown as arranged in axial alignment.

Each solenoid has a core member movable axially thereof, said core members being indicated at 9 and 10 respectively. These core members are rigidly connected together and form in effect a single core element which is arranged so that when the solenoid 7 is energized the core element will be moved to the left, Fig. 2, while when the solenoid 8 is energized the core element will move to the right. This vibrating movement of the core element is utilized to oscillate the shaft 5 and for this purpose said shaft has fast thereon a segmental gear 11 and the core element 9, 10 is formed with the tooth portion which meshes with the teeth of the gear 11. The teeth 12 are preferably formed so as to extend clear around the core element, therefore a proper operative connection between the core element and the gear 11 is provided at all times notwithstanding the fact that the core element may turn about its axis.

Means are provided, which will be presently described, for alternately energizing the solenoids 7 and 8 so as to give the core element 9, 10 its vibrating or reciprocating movement.

One feature of my invention relates to means for controlling the speed at which the core element 9, 10 may move, thus controlling the speed of movement of the wiper 3. This is herein accomplished by providing a tube 13 which extends axially of each solenoid and on both solenoids are mounted and in which the core element is received.

The ends of the core member fit the interior of the tube so that said tube becomes in effect a cylinder in which the core members 9 and 10 operate as plungers. Each cylinder is provided with a restricted leak port which restricts the speed with which the air can enter either end of the tube 13 or be discharged therefrom as the core element reciprocates.

These leak ports may be provided for in various ways without departing from the invention. One way is to provide the tube 13 with two heads 14 which close the ends thereof and then provide each head with a restricted port 15. With this construction the cylinder and core members function as dash pots and thus have a retarding action on the oscillating movement of the shaft 5.

I have provided herein a switch device for automatically connecting the solenoids 7, 8 alternately with the circuit and said switch device is preferably actuated at the end of each stroke by the gear 11.

The housing 6 supports within it a plate 16 of insulating material which carries two contacts 17, 18 that are insulated from each other. One contact is connected by a wire 19 to the solenoid 7 and the other contact is connected by a wire 20 to the solenoid 8.

Each solenoid has a circuit connection 21 connected thereto both of which lead to the battery 22. The battery 22 is connected by a wire 23 through a manually-operated switch to a combined contact member and spring 24 that is carried by the plate 16. This member 24 is formed with the foot portion 25 that is secured to the plate 16 and with the two U-shaped resilient arms 26, the latter being connected by the bridge portion 27 that constitutes a contact portion.

28 indicates a swinging switch arm which is pivoted on a stud 29 carried by the plate 16, said switch arm 28 preferably being of insulating material and carrying a contact member 30, one end of which rests against the back side of the bridge portion 27, and the other of which rests against the face of the plate 16. The swinging movement of the arm 28 from the full to the dotted line position Fig. 4 operates to carry the contact member 30 from the contact 17 to the contact 18 and at the same time, said contact 30 is continuously in engagement with the bridge 27. The contact member 30 may conveniently be made of carbon and will preferably be loosely mounted in an aperture in the arm 28 so that the resiliency of the spring arms 26 will hold the contact member 30 yieldingly against the face of the plate 16. Since the member 24 is connected to the battery through the circuit connection 23 it follows that when the arm 28 is in the full line position with the contact member 30 engaging the contact 17 a circuit will be established from the battery through the member 24 and its bridge portion 27, through the contact member 30 to the contact 17 and thence to the solenoid 7 through the circuit connection 19.

On the other hand when the switch arm 28 is in the dotted line position Fig. 4, the contact member 30 is in engagement with the contact 18 and a circuit will be established through the solenoid 8.

Means are provided for automatically reversing the position of the arm 28 at the end of each stroke of the core member 9, 10. Loosely mounted on the stud 29 is an oscillating member 31 having at one end an arm 32 which extends laterally through the slot 33 in the plate 16 and is adapted to be engaged by pins 34 carried by the gear segment 11. This oscillating member 31 is also provided at its upper end with a laterally-extending arm 35 to which is connected one end of a spring 36, the other end of the spring being connected to a pin 37 extending from the arm 28.

Assuming that the arm 28 is in the full line position Fig. 4 with the contact 30 in engagement with the contact 17, the oscillating member 31 will also be in the full line position, and the spring 36 will act to hold both these parts in such position, the slot 33 having such a shape that the arm 32 and the extended end 38 thereof will engage the end walls of the slot or opening and thus form stops to hold them in this position.

When the contact member 30 is thus engaging the contact 17 the solenoid 7 will be energized and the core member 9, 10 will be drawn toward the left, Fig. 2. As said core approaches the end of its stroke to the left one of the pins 34 on the gear 11 will engage the arm 32 and swing the member 31 toward the dotted line position Fig. 4. As soon as the member 31 has been turned sufficiently to carry the spring 26 past the center of the stud 29, then said spring will operate to swing the arm 28 from the full to the dotted line position Fig. 4 and said arm and the member 31 will both assume the dotted line position in said figure. This will shift the contact 30 from engagement with the contact 17 to engagement with the contact 18 and thus energize the solenoid 8. When this occurs the core member 9, 10 will be drawn to the right Fig. 2 and as it approaches the end of its stroke the other pin 34 will engage the arm 32 and again reverse the position of the member 35 and arm 34. The solenoids are thus alternately energized and because of the construction provided for by the tube 13 and core member 9, 10, the swinging movement of the wiper in each direction will be controlled so that the wiper 3 will operate effectively.

I prefer to employ a manually-controlled switch by which the current from the battery may be turned onto the device or cut off therefrom. This switch is herein shown in the form of two contact arms 39 and 40 which are secured to the plate 16 but are insulated from each other. The contact 39 is shown as connected to the member 24, both contact members being secured to the plate by the same screw 41. The contact 40 is connected to the circuit wire 23. Situated between the contacts is a sliding push member 42, the two ends of each being of insulating material and the central portion 43 of which is of conducting material. This push member 42 is slidably mounted in apertures formed in the wall 44 of the housing 6 and it is provided with two annular grooves 45, and 46 adapted to receive points 47 formed on the contacts 38, 39. The groove 45 is in the insulating portion of the push member and the groove 46 in the conducting portion 43. When the push member is in the position shown in Fig. 4, the switch is open because the insulating portion of the push member is between the contacts 39 and 40. When the member is pushed over into the dotted line position, Fig. 4, then the part 43 comes between the contacts 39 and 40 thus closing the circuit and setting the device in operation.

In the construction herein shown the housing 6 is designed to receive the switch mechanism and to support the tube 13 which extends beyond the walls of the housing and the solenoids 7, 8 are on the ends of the tube 13 outside of the housing 6 but having their ends abutting against the walls of the housing.

Each solenoid is enclosed in a cup-shaped cover 47, which cover is retained in place by a screw 48 which screws into the block 14. The wires from the battery 22 are led into the casing 6 in the form of a cable 49, the latter passing through an opening 50 formed in said housing.

I claim:

1. In a motor device for operating a wind shield cleaner and the like, the combination with two solenoids, of a core element common to both, said core element having annular rack teeth, a gear meshing with said rack teeth, the annular shape of the rack teeth providing operative engagement between the rack and gear in any position which the core may assume about its axis, and means controlled by the gear for energizing the solenoids alternately.

2. In a motor device for operating a wind shield cleaner and the like, the combination with two solenoids, of a core element common to both, said core element having annular rack teeth, a gear meshing with said rack teeth, the annular shape of the rack teeth providing operative engagement between the rack and gear in any position which the core may assume about its axis, means controlled by the gear for energizing the solenoids alternately, and means to retard the solenoid-actuated movement of the core in each direction.

3. In a device of the class described, the combination with two solenoids each having a central chamber, a core element common to both solenoids, one end of the core fitting and operating in one chamber and the other fitting and operating in the other chamber, the end of each chamber being closed except for a restricted port, said core element having rack teeth, a gear meshing with said rack teeth, means controlled by the gear to energize the solenoids alternately, said chambers and the ends of the solenoid constituting a retarding device for retarding the solenoid-actuated movement of the core.

4. In a device of the class described, the combination with two solenoids, of a core member common to both solenoids, a contact for each solenoid, a swinging arm, a contact member loosely sustained by said arm and adapted by the swinging movement of the arm to be brought into engagement with the contacts alternately, a resilient member with which the contact member engages in all positions of the swinging arm, said resilient member yieldingly holding the contact member against the contacts, a circuit for the solenoids including said resilient member and contacts, and means actuated by the core to give the arm its swinging movement.

In testimony whereof, I have signed my name to this specification.

CHARLES N. COLSTAD.